Figures 1, 2:
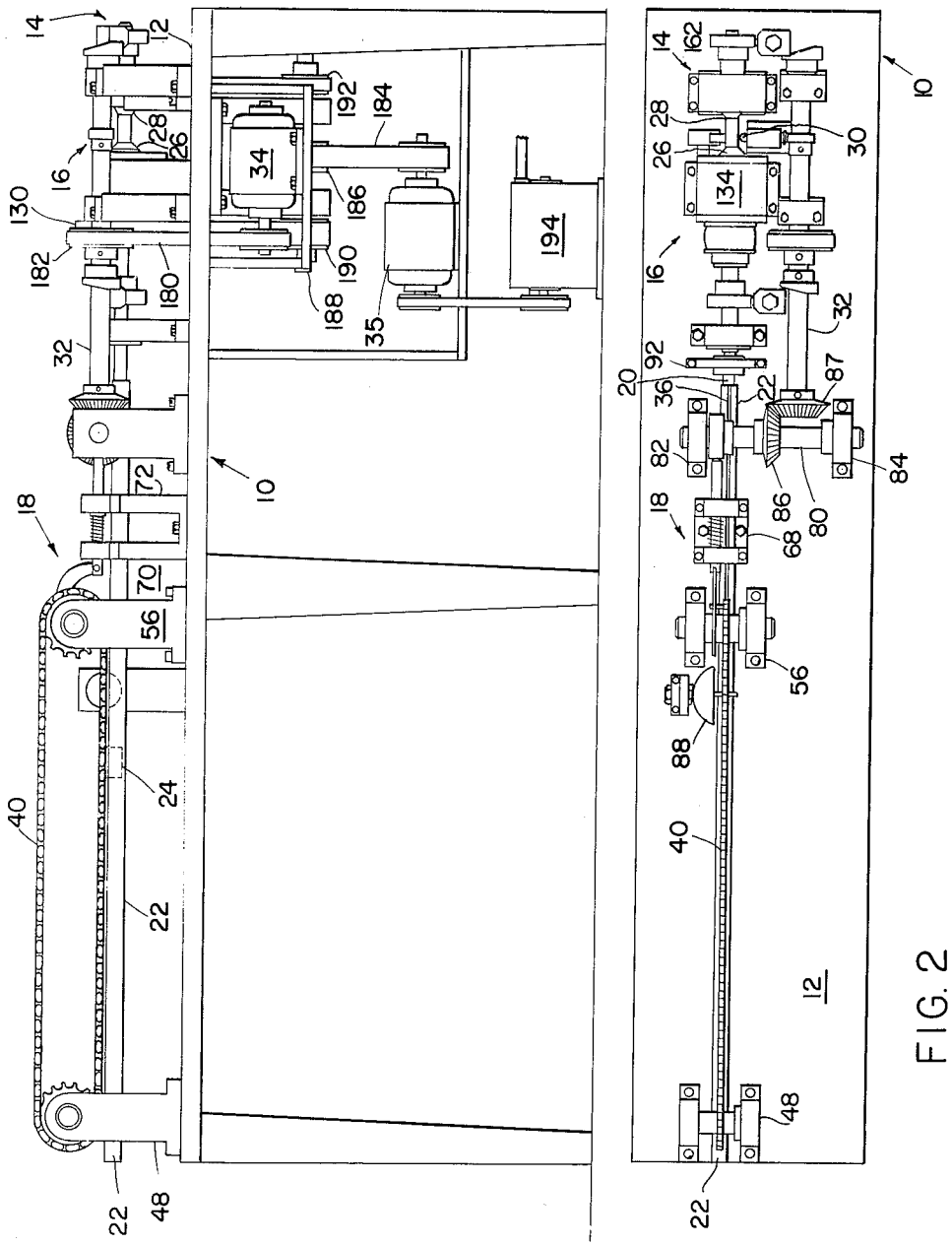

Sept. 14, 1965

A. OGREN 3,205,737

AUTOMATIC LATHE

Filed Feb. 11, 1963

5 Sheets-Sheet 1

INVENTOR.
ARTHUR OGREN
BY Morse & Altman
ATTORNEYS

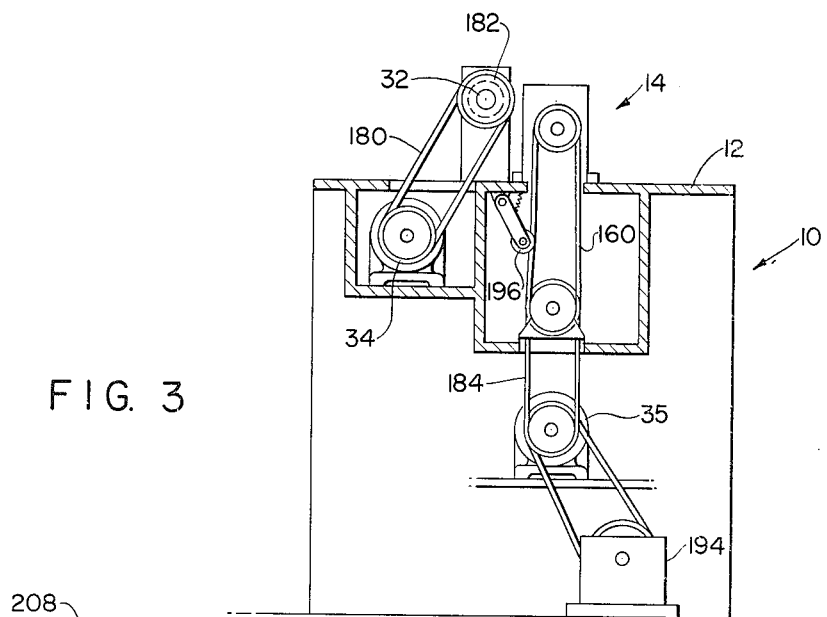
FIG. 3
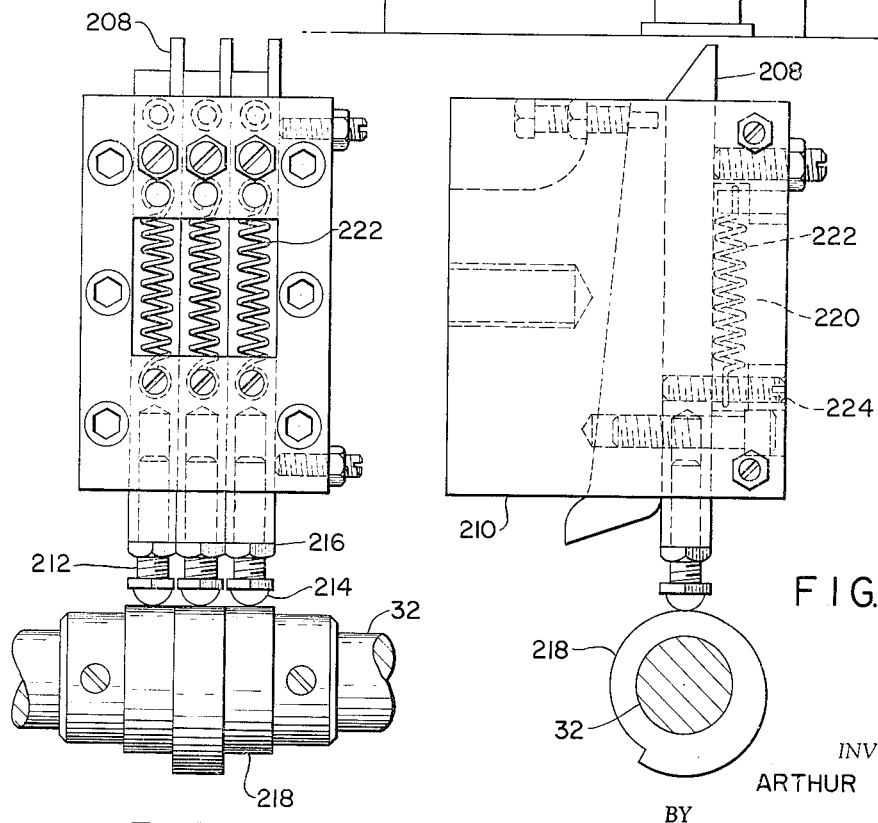
FIG. 7
FIG. 8

INVENTOR.
ARTHUR OGREN
BY
Morse & Altman
ATTORNEYS

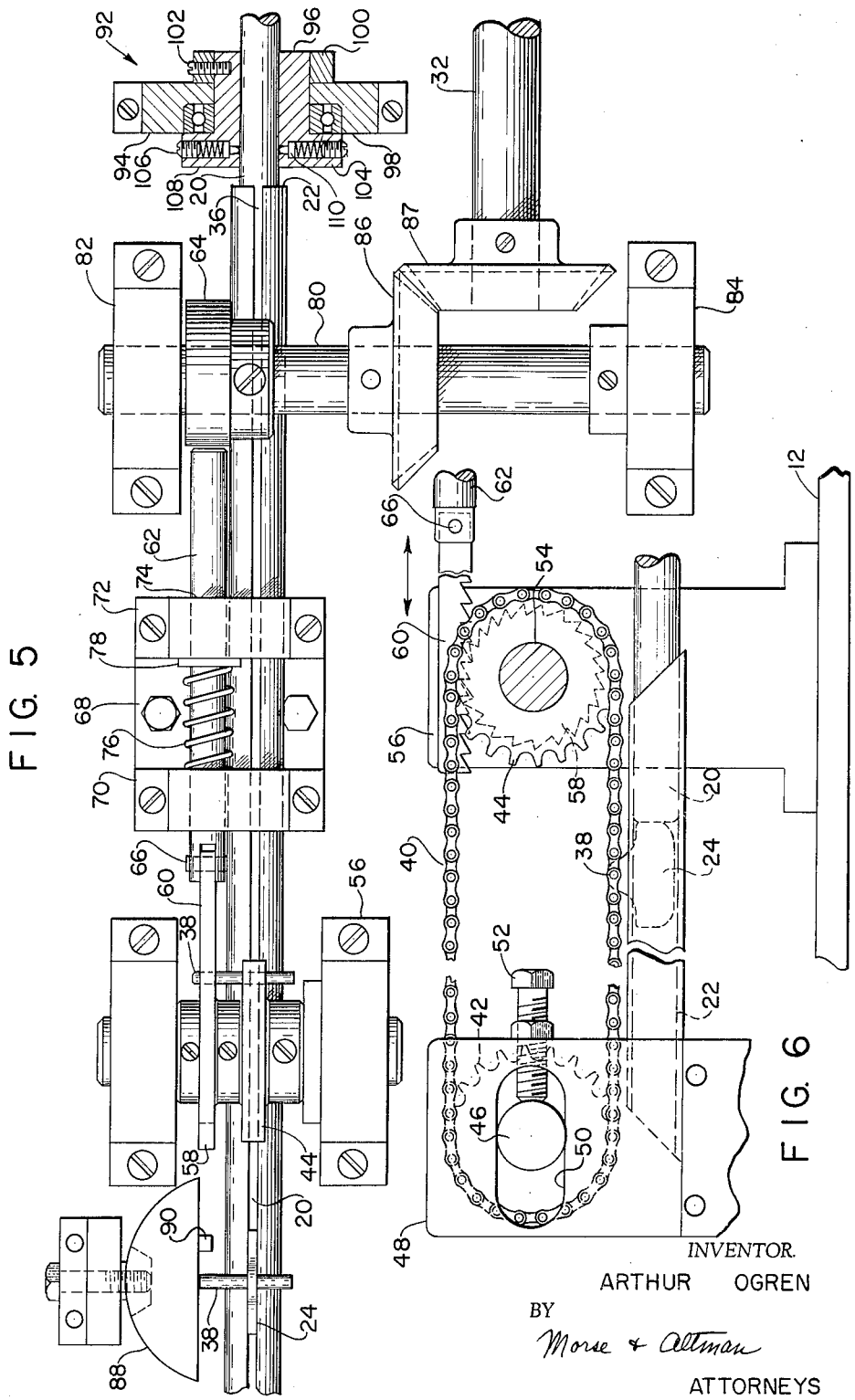

United States Patent Office 3,205,737
Patented Sept. 14, 1965

3,205,737
AUTOMATIC LATHE
Arthur Ogren, 16 Leonard St., Greenfield, Mass.
Filed Feb. 11, 1963, Ser. No. 257,667
4 Claims. (Cl. 82—2.5)

This invention relates generally to automatic lathes and more particularly is directed towards a new and improved continuous feed type screw machine adapted to form a variety of lathe operations, efficiently, automatically and at a high rate of speed.

In present automatic screw machines, a length of stock is fed into register with cutting tools which are adapted to move against the stock and cut it in a predetermined manner. Normally, the stock is held by the jaws of a chuck which permit axial advance of the stock after a section has been cut. While existing screw machines are able to perform the required cutting of the stock at a relatively high rate of speed, frequently the products will require additional finishing operations to remove burrs and other imperfections resulting from the cutting operation. Also the quality of components manufactured by existing screw machines tends to vary by reason of axial slippage of the stock in the machine and lateral displacement of the stockwhile it is being cut. Certain other factors involved in the manufacture of screw machine products by conventional machinery tend to reduce the number of product units that conform to specifications.

Accordingly, it is an object of the present invention to provide improvements in automatic lathes and the like.

Another object of this invention is to provide an automatic screw machine adapted to produce automatically and at a high rate of speed components of a uniformly high quality and of precise dimensions.

Still another object of this invention is to provide a novel feeding arrangement for automatically delivering stock to the cutting portion of an automatic lathe.

Yet another object of this invention is to provide a novel arrangement for supporting stock while it is being cut.

A still further object of this invention is to provide an improved mechanism for supporting and moving cutting tools for an automatic lathe.

More particularly this invention features an automatic lathe comprising a pair of spaced tubular collets adapted to support a section of stock while it is being cut. The collets are adapted to open and close upon the stock in response to a timed drive system and are rotatable with the stock while it is being cut. This invention also features a continuous stock feeding arrangement which functions in cooperation with the timed drive system to advance stock incrementally into the bite of the collets. As another feature of this invention, a novel stockholder is provided to prevent axial slippage or lateral displacement of the stock while it is being cut. As still another feature of this invention, the cutting tools employed in the lathe are spring loaded to a mounting block for reciprocation into cutting engagement with the stock.

Figure 4:
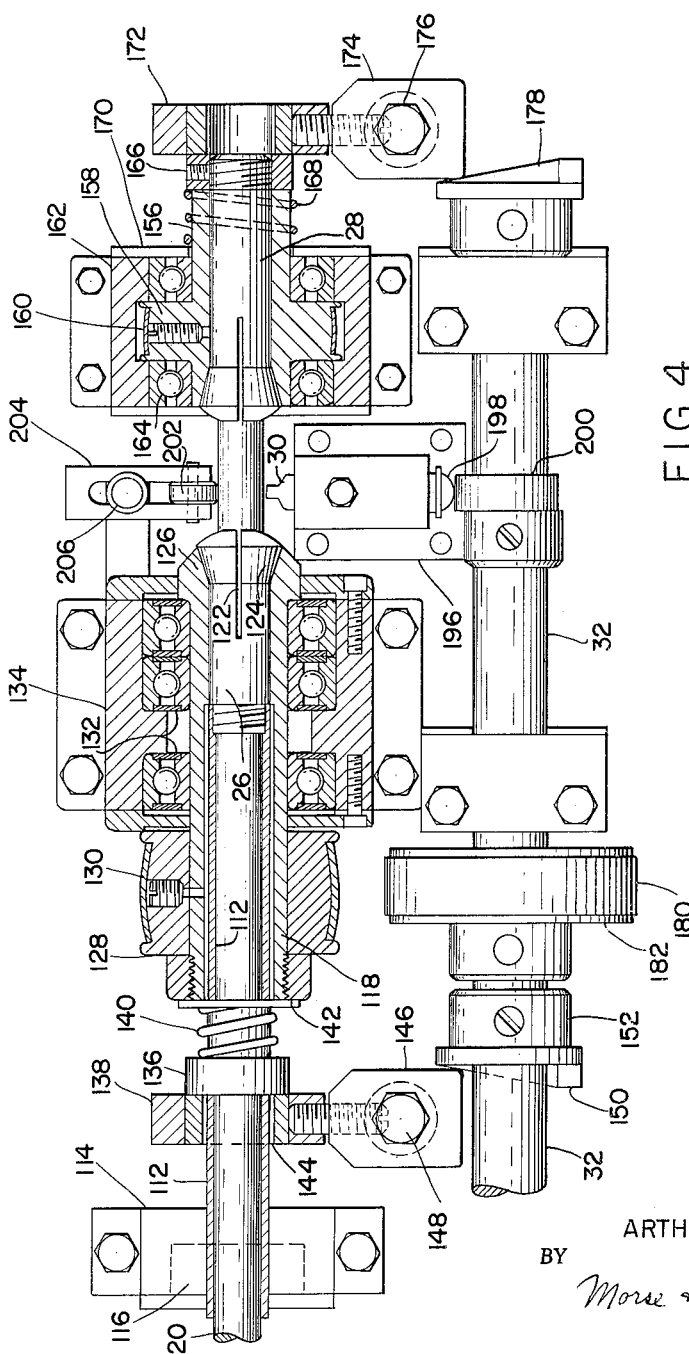
Figure 10:
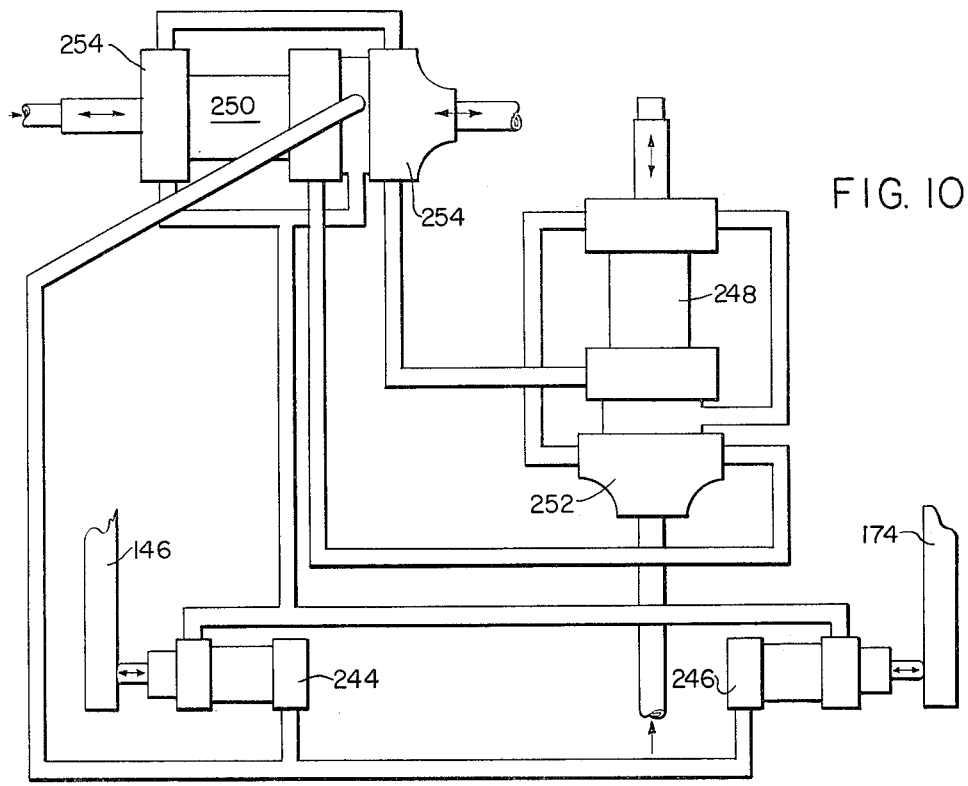
Figure 9:
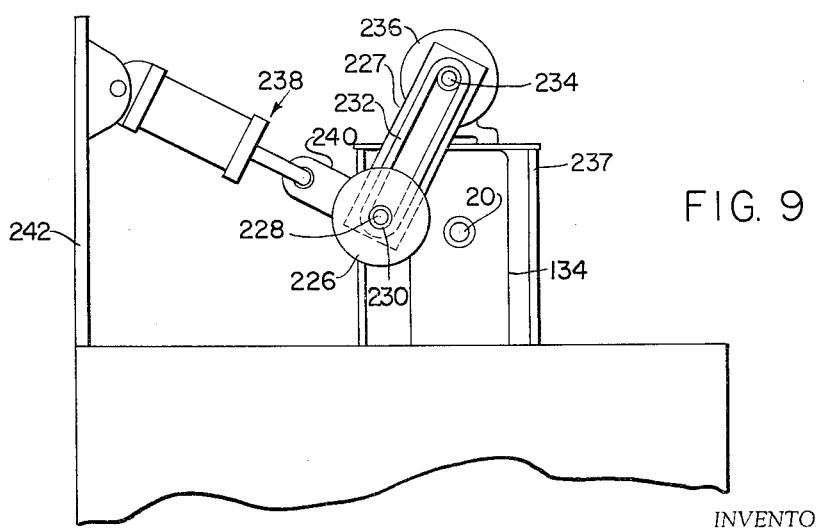

But these and other features of the invention along with further objects and advantages thereof, will become more fully apparent from the following detailed description of the invention, taken in connection with the accompanying drawings in which:

FIG. 1 is a view in side elevation of an automatic lathe made according to the invention, FIG. 2 is a top plan view of the apparatus shown in FIG. 1, FIG. 3 is an end elevation partly in section of the apparatus shown in FIGS. 1 and 2, FIG. 4 is a detailed top plan view partly in section, showing the cutting portion of the apparatus, FIG. 5 is a view similar to FIG. 4 but showing the feed portion of the apparatus, FIG. 6 is a detailed view in side elevation showing the drive mechanism for the feed system, FIG. 7 is a detailed top plan view of the cutting tools and their driving mechanism, FIG. 8 is a view in side elevation of the mechanism shown in FIG. 7, FIG. 9 is an end elevation of a modification of the invention, and FIG. 10 is a schematic diagram of another modification of the elevation.

Referring now to the drawings and to FIGS. 1 and 2 in particular, the invention is generally organized about a table 10 having an elongated horizontal bed 12 on which is mounted an automatic lathe 14. The lathe 14 generally comprises a cutting or forming section 16 and a stock feeding section 18. Details of the cutting section appear in FIG. 4 while FIGS. 5 and 6 show details in the construction of the stock feeding section.

In general, feed stock is fed into the lathe from left to right as viewed in FIGS. 1 and 2 and initially a length of feed stock, such as a cylindrical metal rod 20, is inserted in the left hand end of a feed tube 22 where an intermittently actuated pusher 24 engages the end of the stock to advance it axially into the cutting section of the lathe. The cutting section includes a pair of axially spaced tubular collets 26 and 28 which engage the feed stock and rotate with it. The cutting tool 30 is adapted to move into and out of cutting engagement with that section of the feed stock held between collets 26 and 28. Both the cutting tools and the stock pusher are driven by a cam shaft 32 which is normally rotated at a relatively low speed with respect to the stock which is normally rotated at a relatively high speed. Two separate drive systems are employed as best shown in FIG. 3 where it will be seen that a motor 34, mounted to the table 10, drives the cam shaft 32 by means of a belt and pulley system. Similarly a motor 35 is also mounted to the table 10 and is adapted to drive the collets and the feed stock through a separate pulley system at a high rate of speed.

Referring now more particularly to FIGS. 5 and 6, the stock feed section will be described in detail. The feed tube 22 is elongated and extends substantially one half the length of the table bed 12. It will be noted that the feed tube is slit lengthwise along its upper section to form a longitudinal slot 36 extending the full length of the tube 22. It will be understood that the inside diameter of the feed tube 22 is sufficient to accommodate the feed stock 20 which is passed therethrough. The pusher 24 is in the form of a generally rectangular flat plate with slightly rounded corners and is articulated by a pin 38 to a chain link belt 40. The forward face of the pusher, during operation of the machine, engages the end of the feed stock 20 as illustrated in FIG. 6 and moves the stock as the belt is advanced. The belt 40 is looped over a pair of sprocket gears 42 and 44 with the gear 42 being rotatably mounted on a shaft 46 supported at its ends by bearings 48. It will be noted in FIG. 6 that the bearings 48 are formed with horizontally elongated openings 50 to receive the shaft 46 and to permit tensioning of the belt 40 by means of an adjustment bolt 52 threaded to the bearing blocks.

The sprocket 44 is mounted fast to a shaft 54 rotatably supported by a pair of spaced bearings 56 and it will be noted that the shaft 54 also carries a ratchet gear 58 adapted to mesh with a pawl 60. The pawl 60 extends horizontally along the top portion of the gear 58 and is adapted to be reciprocated by means of an actuating mechanism which includes a spring loaded driver 62 and a cam 64. The pawl 60 is pivotally connected to the end of the actuator 62 by means of a horizontal pin 66. The actuator 62, in turn, is mounted to the table bed 12 by means of a support bracket 68 which includes a pair of upright frame members 70 and 72 which also provide support for the feed tube 22. The actuator 62 passes through aligned openings 74 formed in the members 70 and 72 and is urged in a normally forward position by means of a compression spring 76 engaging a collar 78, secured to the actuator, and the forward wall of the frame member 70.

As best shown in FIG. 5, cam 64 is mounted fast to a crossover shaft 80 arranged transversely to the lathe and rotatably supported at its ends by bearing blocks 82 and 84 fastened to the table bed 12. The shaft 80 also carries a bevel gear 86 in mesh with a bevel gear 87 mounted fast on the end of the cam shaft 32. It will be understood that by rotating the cam shaft 32 at a constant speed the crossover shaft 80 will be rotated also at a constant speed, and this in turn will cause the actuator 62 to reciprocate back and forth under the action of the cam 64. As the actuator 62 is reciprocated, the pawl 60 will cause the sprocket gear 44 to be rotated in increments thereby advancing the chain 40 and the pusher 24, all of which combine to advance the stock 20 along the feed tube 22 into the lathe 14.

As the trailing end of the feed stock passes through the tube 22, the pusher will be carried up and out of the tube 22 through the slot 36 and around the sprocket gear 44. This will, of course, prevent further advance of the feed stock 20, and in order to signal the operator, a bell 88 is mounted alongside the tube 22. The pin 38, as best shown in FIG. 5, has sufficient length to strike a bell clapper 90 as the pusher 24 passes by. The pin 38 also functions to lift the pawl 60 out of mesh with the ratchet gear 58 as the pusher 24 is carried up and over the sprocket 44. This will prevent advancement of the pusher and allow time for the operator to insert a fresh length of stock into tube 22. It will be noted that the rounded corners of the pushers 24 permit clearance between the pusher and the walls of the tube as the pusher is pivoted about the sprocket gear and out of the tube.

As the stock is fed out of the forward end of the tube 22 towards the lathe section 16, it passes through a stockholder 92 which is adapted to prevent the stock 20 from being laterally displaced and to hold it against accidental axial slippage. The stockholder comprises a frame 94 bolted to the table bed 12 and is provided with a central opening to acommodate a collar 96 inserted therein. Between the collar and the frame, there is mounted a ball bearing asembly 98 which permits the collar to rotate within the frame. The collar 96 is held in position by means of a locking annulus 100 which is connected to the collar by means of radial set screw 102. At the rear end of the collar a plurality of radial openings are formed in a flanged extension 104 of the collar. Each of the openings accommodates a set scew 106, threaded to the walls of the opening, a coil spring 108 and a follower 110 having a rounded inner end. It will be understood that by adjusting the compression of the springs 108, the followers may apply a predetermined pressure against the feed stock 20. This pressure will prevent accidental slippage of the stock as it advanced by the feed mechanism and will provide support against radial displacement of the stock as it is being cut. It will also be understood that the collar 96 may be formed in a variety of sizes to accommodate different sizes of stock and that the collar may be readily replaced by merely backing off the screw 102.

Referring now more particularly to FIG. 4 of the drawings, the lathe portion of the apparatus will be described in detail. The stock 20, as shown on the left hand side of FIG. 4, enters a tubular draw bar 112 which has its left hand end supported by a bearing block 114, carrying a frictionless ball or roller bearing assembly 116.

The draw bar 112 passes into a spindle 118 and has its tapped forward end connected to the threaded end portion of the tubular collet 26. The collet will be seen to be formed with a plurality of radial cross slits 122 defining a plurality of jaw segments and is formed with a frusto conical portion 124 which mates with a frusto conical abutment or seat portion 126 formed on the forward end of the spindle 118. In the position illustrated in FIG. 4, the jaws of the collet grip a section of the feed stock 20 and rotate with it. The spindle 118 carries a pulley 128 over which a belt 130 is roven, and the spindle assembly is rotatably supported by ball bearing assemblies 132 to a housing 134 fastened to the table bed 12.

The draw bar 112 is formed with a collar 136 which, on its left hand side, bears against an annular yoke 138 and on its right hand side engages a coil spring 140. The spring 140 also butts against an annular plate 142 positioned against the rear end of the spindle 118. The yoke 138 is formed with an axial opening slightly greater in diameter than the outside diameter of the draw bar 112 to form an annular clearance 144. The yoke 138 is mounted for angular movement to a rocker arm 146 which is pivoted about an upright post 148.

The rocker arm and its yoke are actuated by means of a cam face 150 formed on a collar 152 mounted on the cam shaft 32. It will be understood that as the cam shaft rotates about its longitudinal axis, the cam face 150 will bear against the forward edge of the rocker arm 146 biasing it in a clockwise direction as viewed in FIG. 4. This will cause the yoke 138 to pivot through a small arc and thereby push forwardly both the collar 136 and the draw bar 112. Since the collet 26 is connected to the draw bar, its forward jaw portion will be axially displaced from the seat portion 126 and this will release the collets grip on the feed stock 20. As the cam 150 completes its cycle, the spring 140 will urge the draw bar and the yoke rearwardly to the closed position shown in FIG. 4. This, of course, will retract the collet 26 back fully into the spindle and will reseat the conical jaw portion which will again grip the feed stock 20. It will also be understood that the cam 150, is so designed and arranged as to operate in timed coordination with the cam 64 which activates the feed mechanism. The arrangement is such that the collet 26 will release its grip on the feed stock as the feed stock is being advanced and will grip the stock during periods of dwell of the stock feeding apparatus. Also it will be appreciated that the collet will be gripping the stock during cutting operations which take place during the dwell periods of stock feed so that the stock will be held in a fixed axial position relative to the cutting tools.

The second collet 28 is spaced oppositely to and coaxially with the collet 26 and is adapted to grip the feed stock 20 on the right hand side of the cutting tool so that the section of stock that is being cut will be fully supported at both ends. The collet 28 is adapted to open a moment after the collet 120 opens and close a moment before the collet 26 is closed to prevent any rearward movement of the stock. The mechanism for the carrying out of the opening and closing of the collet is similar to the mechanism described in connection with the collet 26.

As illustrated in FIG. 4, the collet 28 is mounted within a tubular spindle 156 which has a pulley 158 formed integral therewith. A belt 160 is looped over the pulley and is driven by the motor 35 that drives the belt 130 so that both collets are rotated at the same speed and in the same direction. The spindle and pulley are rotatably supported to a housing 162 by means of ball bearing assemblies 164. The configuration of the collet, its jaws, and the seating arrangement matches that of the collet 26 and spindle 118. At the right hand end of the spindle 156, a locking ring 166 engages the collet 28 and holds a coil spring 168 compressed against an annular plate 170 located on the forward face of the housing 162. An annular yoke 172, similar to the yoke 138, is located to the right of the ring 166 and bears against it. As before, the yoke 174 is mounted for pivotal movement to a rocker arm 174 rotatably mounted on an upright post 176. A cam 178 mounted on the right hand end of the cam shaft 32 is adapted to engage and bias the rocker arm and its yoke 174 in a counter-clockwise direction. This will result in the collet 28 being axially displaced to the left and permit its jaws to open so that the stock, which has now been cut, may be pushed along by the following stock and discharged through the open right hand end of the collet 28. The collet 28 will, of course, retract after the cam 178 has passed out of engagement with the rocker arm 174. As before, the spring 168 will return the collet to its original closed position to engage the next section of stock that has been advanced.

Referring more particularly to FIGS. 1 and 3, there are shown details in the pulley arrangement for driving both the cam shaft 32 and the spindles 118 and 156. As previously mentioned, the motor 34 rotates the cam shaft 32 by means of a belt 180 looped over a pulley 182 secured to the cam shaft 32. In practice the cam shaft will rotate at a speed on the order of 110 r.p.m. This may, of course, vary depending upon various factors such as the hardness of the material being passed through the lathe.

The pulley system for driving the collets and the feed stock includes the motor 35 which is connected by a belt 184 to a pulley 186. The pulley 186 in turn is mounted on a shaft 188 which carries two other pulleys 190 and 192. Over the pulley 190 is looped the belt 130 which is also looped over the pulley 128 for driving the spindle 118. Similarly, the belt 160, which is looped over the pulley 158, is also looped over the pulley 192 so that both sides of the lathe driving system are operated in unison. A typical operating speed for the spindles would be on the order of 10,000 r.p.m. for example. The motor 35 may also be provided with a belt and pulley system for driving an air compressor 194 for furnishing auxiliary air to a mist oiler and which may also be used to eject the cut-off piece if desired. Also, a small spring loaded idler pulley 196 may be mounted to the lathe frame for applying pressure to each of the belts 130 and 160 to maintain tension thereon.

The cutting tool 30 is mounted on a tool block 196 alongside the section of stock between the collets 26 and 28. The cutting edge of the tool 30 is located close to the stock and is adapted to be reciprocated into and out of cutting engagement with the stock. It will be noted in FIG. 4 that the cutting tool is provided at its outer portion with a cam follower 198 which engages a cam 200 secured to the cam shaft 32. It will be understood that as the cam 200 is rotated the cutting tool will reciprocate so as to cut into the stock and then retract in timed sequence so that the stock will be cut while the jaws of the collets are closed upon the stock and so that the cutting tool will be retracted during axial advance of the stock through the collets. A roller 202 is mounted directly opposite the cutting tool in order to prevent the formation of any outside burr on the stock while it is being cut. If any burr does develop, it is immediately rolled in and removed by the cutting tool. It will be understood that since the stock is held firmly by both collets turning together, no end burr can remain after the stock has been cut off. The roller 202 is mounted for lateral adjustment by a roller arm 204 adjustably connected to an upright post 206.

Referring now more particularly to FIGS. 7 and 8, there is shown a tool holder assembly and mounting arrangement for performing several cutting operations simultaneously. In this device, three cutting tools 208 are slidably mounted in a base 210 secured to the table bed 12. Several cutting tools 208 are arranged parallel to one another and extend through an opening formed through the base. Each of the cutting tools is tapped at its outer portion to receive a bolt 212 having a cam follower 214 formed integral with its head. Locking nuts 216 are provided so that the cam follower may be adjusted to a selected position. Each of the cam followers engages a cam 218 each of which may be differently contoured depending upon the desired cut to be made in the stock. The cams are secured to the cam shaft 32 and rotate with it. Each of the cutting tools is urged to a normally retracted position by means of a coil spring 220 mounted in a recess 222 formed at the top of the base 210 and extending lengthwise of each cutting tool. The spring is compressed between a wall of the recess 222 and a set screw 224 connected at a right angle to the cutting tool. It will thus be appreciated that as the cam shaft 32 is rotated, the cams 218 will also be rotated and will drive each of the cutting tools into and out of cutting engagement with the stock and the depth of the cut will be determined by the cam profile. Obivously, a variety of different cams may be provided depending upon the desired cut to be made in the stock. Also, the number of cutting tools may be varied as desired and the shape of the cut may be varied by forming the cutting tip of the tool to match the desired cut.

Referring now more particularly to FIG. 9 there is illustrated a modification of the invention and in this embodiment a grinding wheel 226 is mounted for movement to and away from the feed stock 20. The grinding wheel may be used in conjunction with or independently of the cutting tools shown in the principal embodiment. The grinding wheel 226 swings on an arm 227 pivoted to a motor 236 and is rotatably mounted on an axle 228 carrying a small pulley 230. A belt 232 is looped over the pulley 230 and is also looped over a pulley 234 mounted on the shaft of a motor 236 located on the top of a stand 237 straddling the lathe. It will be appreciated that the grinding wheel is free to swing back and forth on the arm 227 into and out of engagement with the stock 20. To control the movement of the grinding wheel a pneumatic piston and cylinder assembly 238 are employed and connected to the grinding wheel axle 228 by means of a coupling 240. The pneumatic cylinder is shown pivotally mounted to an upright frame member 242. Additional support means for the grinding wheel may be provided such as a curved track in which the axle 228 may be mounted and which would be aligned with the stock 20. In addition, other means such as cams and solenoids may be employed to move the grinding wheel in timed sequence into and out of contact with the stock.

In addition to the grinding wheel and tool bits shown, other types of cutting and shaping tools may be employed in the lathe. For example, knurling wheels may be mounted for movement into and out of engagement with the stock or a drill may be arranged co-axial with the feed stock and adapted to move into and out of the tubular collet 28. Numerous other tools may be adapted to the apparatus to produce a variety of different components.

Referring now more particularly to FIG. 10, there is illustrated another modification of the invention and in this embodiment the cam drive system has been replaced by a number of pneumatic cylinders which are employed to actuate the various portions of the machine. In FIG. 10 a pair of pneumatic cylinders 244 and 246 are employed to pivot the rocker arms 146 and 174 illustrated an described in FIG. 4 in connection with the principal embodiment. The system also includes a pneumatic cylinder 248 which is adapted to reciprocate the cutting tool in and out of engagement with the stock that is being cut. A fourth pneumatic cylinder 250 actuates the stock feed mechanism and takes the place of the cam 64 described in connection with FIG. 5. The system is provided with suitable valves 252 and 254 which direct the flow of air through the conduits in such a manner that the collets will be open and the tool retracted while fresh stock is advanced through a lathe. The system is also timed to close the collets onto the stock and advance the tool into the cutting position during periods of dwell in the stock feed mechanism. In place of the pneumatic system shown in FIG. 10, a hydraulic system could also be employed or a solenoid arrangement may be provided.

It will be appreciated that the above described invention is a particularly useful apparatus in that screw machine products may be manufactured at a high rate of speed and to very close tolerances without developing end burrs or side burrs which normally appear in screw machine products made on conventional machines. It will also be appreciated that the apparatus is versatile in that a number of different cutting and forming operations may be performed by the use of different attachments and by adjustment of the cutting tools.

While the invention has been described with particular reference to the illustrated embodiment, it is understood that numerous modifications thereto may be made by those skilled in the art. It will also be understood that the above description and accompanying drawings should be taken as illustrattive of the invention and not in a limiting sense.

Having thus described the invention, what I claim and desire to obtain by Letters Patent of the United States is:

1. An automatic lathe for producing individual components from a length of stock, comprising a pair of tubular collets mounted in spaced co-axial relation to one another, each of said collets being formed with a segmented end portion providing a plurality of jaws adapted to engage the periphery of a section of stock extending co-axially through said collets, a tubular spindle disposed co-axially about each of said collets, said collets and said spindle being axially displaceable relative to one another, each of said spindles being formed with jaw engaging abutment adapted to close said jaws when said spindle and its associated collet are in one axial position and to permit said jaws to open when in another axial position, spring means biasing said collets to closed position, driving means mounting said spindles and said collets for rotation in unison about a common axis, stock forming means mounted between said collets and movable into and out of engagement with said stock, stock feeding means for advancing said stock through said collets, first and second oppositely facing cam means for axially displacing in timed sequence said collets to open position whereby to open first the jaws of one collet and then the jaws of the other collet and then close the jaws of said other collet and then the jaws of said one collet.

2. An automatic lathe for producing individual components from a length of stock, comprising a pair of oppositely facing tubular collets mounted in spaced co-axial relation to one another, each of said collets being formed with a segmented end portion providing a plurality of jaws adapted to engage spaced peripheral portions of a section of stock extending co-axially through said collets, a tubular spindle disposed co-axially about each of said collets, each of said collets being axially displaceable relative to each of said spindles, each of said spindles being formed with an abutment adapted to close said jaws when its associated collet is in one axial position and to permit said jaws to open when in another axial position, spring means biasing said collets to closed position, means mounting said spindles and said collets for rotation about a common axis, driving means for rotating said spindles and collets at the same speed and in the same direction, stock forming means movable into and out of engagement with said stock, stock feeding means for advancing said stock through said collets, and control means to actuate said stock feeding means and said stock forming means at selected intervals, a rocker arm pivotally mounted adjacent each of said collets and adapted to connect drivingly therewith, said control means including first and second oppositely facing cam means for biasing said rocker arms at selected intervals to axially displace first one and then the other of said collets and open first the jaws of one collet and then the jaws of said other collet and then close the jaws of said other collet and then the jaws of said one collet.

3. An automatic lathe for producing individual components from a length of feed stock, comprising a pair of tubular collets mounted in spaced co-axial relation to one another, each of said collets being formed with a segmented end portion providing a plurality of normally open jaws adapted to engage spaced peripheral portions of a section of stock extending co-axially through said collets, a tubular spindle disposed co-axially about each of said collets, each of said collets being axially displaceable relative to each of said spindles, each of said spindles being formed with an abutment adapted to close said jaws when its associated collet is in one axial position and to permit said jaws to open when in another axial position, spring means biasing said collets to closed position, means mounting said spindles and said collets for rotation about a common axis, driving means for rotating both of said spindles and collets in unison, stock forming means movable into and out of engagement with said stock, stock feeding means for advancing said stock through said collets, driving means for sequentially actuating said stock feeding means and said collet displacing means, and first and second oppositely facing cam means for axially displacing said collets in timed sequence whereby to open first the jaws of one collet and then the jaws of the other collet and then close the jaws of said other collet and then the jaws of said one collet.

4. In an automatic lathe for producing individual components from a length of feed stock means for incrementally advancing said feed stock, including a tubular support adapted to acommodate a length of stock inserted therein, said support being axially aligned with said lathe, said support being formed with a longitudinal slit through a wall thereof, a pusher extending through said slit to bear against said stock, a pair of rotatable members spaced from one another and arranged generally tangent to said support, a belt looped over said members and supporting said pusher, a ratchet gear drivingly and coaxially connected to one of said members, a pawl pivotally mounted for reciprocation into and out of mesh with said gear, timed driving means for reciprocating said pawl to rotate said gear, members and belt and thereby advance said pusher and stock along said support and a pin extending from said pusher for disengaging said pawl when said pusher is carried out of said tubular support.

References Cited by the Examiner

UNITED STATES PATENTS

| | | | |
|---|---|---|---|
| 504,083 | 8/93 | Hoffmann | 82—2.5 X |
| 621,418 | 3/99 | Jacobs | 82—2.5 X |
| 1,404,545 | 1/22 | Richardson | 82—34 |
| 1,956,999 | 5/34 | Rupple | 214—1.5 X |
| 2,108,274 | 2/38 | Tautz et al. | 82—913 X |
| 2,326,541 | 8/43 | Kuehn | 82—2.5 X |
| 2,374,112 | 4/45 | Lloyd | 82—2.5 |
| 2,377,384 | 6/45 | Slovak | 82—47 |
| 2,561,035 | 7/51 | Robichaud | 82—19 X |
| 2,626,452 | 1/53 | Gridley | 214—1.4 |
| 2,844,315 | 7/58 | Zelinsky | 82—2.5 X |

FOREIGN PATENTS

| | | |
|---|---|---|
| 153,803 | 10/53 | Australia. |
| 887,006 | 1/62 | Great Britain. |

WILLIAM W. DYER, Jr., *Primary Examiner.*